Patented Jan. 16, 1923.

1,442,743

UNITED STATES PATENT OFFICE.

CHARLES J. STROSACKER, OF MIDLAND, MICHIGAN, ASSIGNOR TO THE DOW CHEMICAL COMPANY, OF MIDLAND, MICHIGAN, A CORPORATION OF MICHIGAN.

PROCESS FOR MAKING PHENYL GLYCINE.

No Drawing.    Application filed May 23, 1918.    Serial No. 236,100.

*To all whom it may concern:*

Be it known that I, CHARLES J. STROSACKER, a citizen of the United States, and a resident of Midland, county of Midland, and State of Michigan, have invented a new and useful Improvement in Processes for Making Phenyl Glycine, of which the following is a specification, the principle of the invention being herein explained and the best mode in which I have contemplated applying that principle, so as to distinguish it from other inventions.

There are several well understood methods for making indigo which start with aniline as a base, the principal intermediate product being phenyl glycine ($C_6H_5NHCH_2CO_2H$). One of the earliest methods developed for making phenyl glycine from anilin was by reacting thereon with chloracetic acid, preferably three or more molecular proportions of anilin to one molecular proportion of the chloracetic acid being used. This process has, however, presented considerable difficulties in the practical carrying out of the same, principally due to the formation of other undesirable intermediates, such as anilide, whereby the yield of the desired phenyl glycine has been correspondingly reduced.

One object of the present invention is the improvement or modification of the above described process for making phenyl glycine whereby these difficulties or losses are obviated, thereby greatly increasing the yield of phenyl glycine, while another object is to provide for the ready separation of the phenyl glycine from the other products of the process.

To the accomplishment of the foregoing and related ends the invention therefore consists of the steps hereinafter fully described and particularly pointed out in the claim, it being understood that the steps set forth in the following description constitute but one of several ways in which the principle of the invention may be carried out.

According to my present improved method or process, I conduct the reaction between suitable proportions of anilin and chloracetic acid in the presence of water, the water being approximately one part in four by weight of the combined mixture. This mixture is then heated to a temperature at which the reaction starts, whereupon such reaction goes to completion with the generation of heat so that no further application of heat is necessary.

The products formed as a result of the foregoing reaction are the aniline salt of phenylglycine and aniline hydrochloride, as indicated by the following equation:—

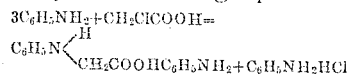

As soon as the reaction is complete I add to the mixture a suitable neutralizing agent, as for example an alkali metal or alkaline earth metal carbonate, in amount approximately sufficient to react with such hydrochloride, with the result that the latter is decomposed into aniline oil and the corresponding metal chloride. This reaction, assuming sodium carbonate to be used as neutralizing agent may be represented by the following equation:—

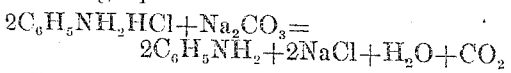

Previously to the addition of such neutralizing agent the products in the reaction vessel are completely miscible, but promptly following the addition of said neutralizing agent there is a separation of such products into two layers. Of these the lower layer will be a watery solution of the metal (e. g., sodium) chloride, only small amounts of the other products being present; while the upper layer will contain the aniline salt of phenylglycine and the aniline oil resulting from the last described reaction.

Upon the mixture becoming stratified in this fashion, the lower layer is drawn off so as to leave the upper layer of aniline salt of phenylglycine and aniline oil, which are then drawn into a solution of alkali metal carbonate giving the corresponding metallic salt of phenylglycine and freeing additional aniline oil. This aniline with that already present is then decanted off and used over again in a repetition of the preceding steps, while the metallic salt of phenylglycine is evaporated to dryness and is then ready for use in the next or fusion step in the manufacture of indigo, or for such other purpose as may be desired.

As a specific illustration of the amounts of the different ingredients required in carrying out my process the following example may be given, viz: 300 pounds of chloracetic acid and not less than 900 pounds of aniline oil, together with about 450 pounds of water, are brought together in a suitable reaction vessel provided with a stirrer. As previously indicated, this mixture requires to be heated only to a temperature at which the reaction starts, going then to completion with the generation of heat. With the amounts stated such reaction should be completed in approximately 45 minutes, the products formed being aniline salt of phenylglycine and aniline hydrochloride, with practically no impurities. To the foregoing products, which remain mixed together, will then be added in the same vessel, 150 pounds of sodium carbonate which is a little less than enough to react with all of the aniline hydrochloride present. The result of such addition will be readily understood from the description previously given of the general process as also the subsequent steps necessary to produce the final product which ordinarily is sodium phenyl-glycinate, sodium carbonate being the preferred neutralizing agent used in saponifying the aniline salt of phenylglycine.

The result of the foregoing procedure is not only an unusually high yield (as much as 90% of the theoretical being obtained) but the manipulation of materials involved is simply and easily accomplished requiring a minimum of apparatus and attendance. It will be understood of course that while reference has been made specifically to aniline, its homologues and derivatives may find utilization in a process such as the one just described, and, similarly, that various phenyl-glycine bodies may be produced, in addition to the ones specifically mentioned.

Other modes of applying the principle of my invention may be employed instead of the one explained, change being made as regards the steps herein disclosed, provided the steps stated by the following claim or the equivalent of such stated steps be employed.

I therefore particularly point out and distinctly claim as my invention:—

In a method of making phenyl-glycine wherein aniline and chloracetic acid are intermixed in a body of water, the steps which consist in raising the temperature of such mixture until reaction starts between such aniline and acid, and then allowing such reaction to go to completion without further heating, whereby the aniline salt of phenyl-glycine and aniline hydrochloride are formed.

Signed by me this 15th day of May, 1918.

CHARLES J. STROSACKER.